United States Patent [19]

Danker

[11] Patent Number: 4,676,595

[45] Date of Patent: Jun. 30, 1987

[54] BICYCLE WHEEL SAFETY INSERT

[76] Inventor: Otto J. Danker, 304 Sound Beach Ave., Old Greenwich, Conn. 06870

[21] Appl. No.: 814,368

[22] Filed: Dec. 30, 1985

[51] Int. Cl.⁴ .............................................. G02B 5/12
[52] U.S. Cl. .................................................. 350/99
[58] Field of Search ........................... 350/97, 99, 103

[56] References Cited

U.S. PATENT DOCUMENTS 2,621,081  12/1952  Mann ..................................... 350/99
3,796,465  3/1974  Cordiak .................................. 350/99
4,209,230  6/1980  Perkins .................................. 350/99

Primary Examiner—John K. Corbin
Assistant Examiner—Vincent J. Lemmo
Attorney, Agent, or Firm—Francis N. Carten

[57] ABSTRACT

A bicycle wheel safety insert formed of an annular disk containing a design that imparts dynamic action when placed in a spoked bicycle wheel and rotated thereby attracting the attention of motorists. The insert contains a slit to allow the insertion of the insert within the rim and between the spokes of a wheel. A hole is located on each side of the slit to accept a tie between said holes and a spoke of the wheel. A fluorescent and/or a reflective material, when placed on the insert, provides additional safety protection to the cyclist.

10 Claims, 3 Drawing Figures

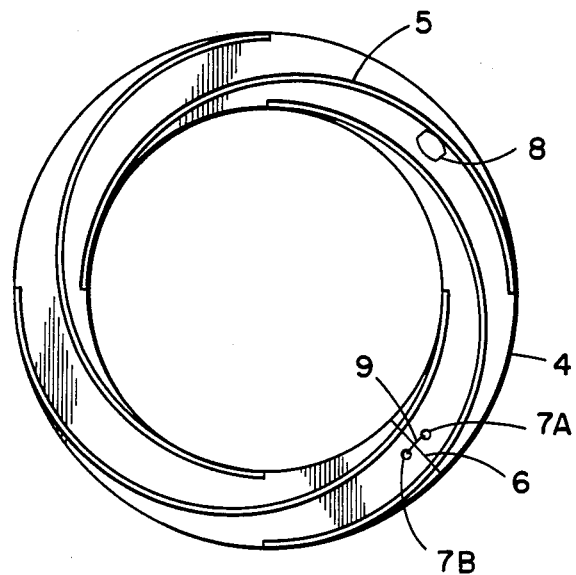
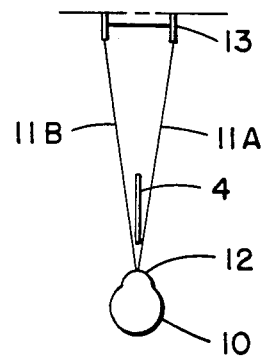
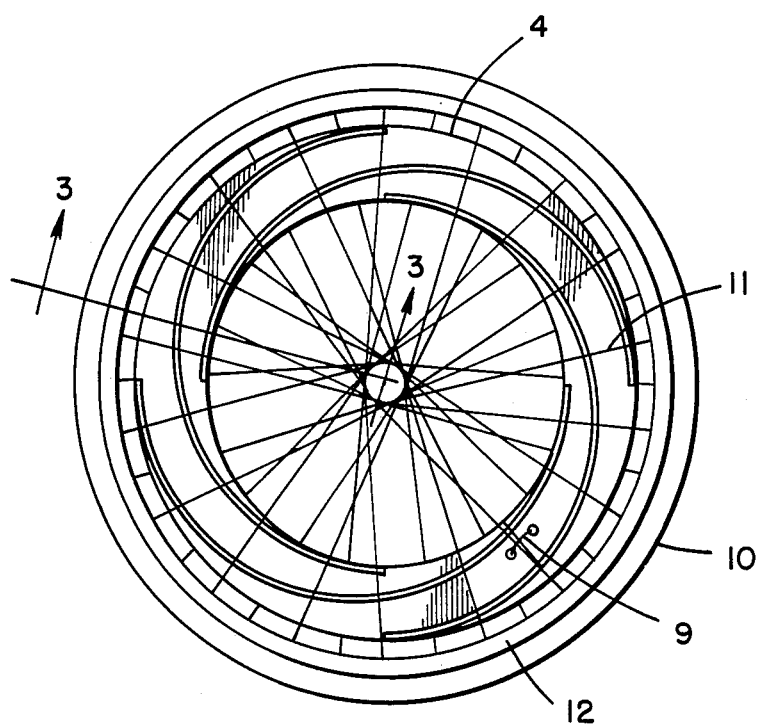

BICYCLE WHEEL SAFETY INSERT

BACKGROUND OF THE INVENTION

Spoked bicycle wheels have long been the subject of decoration. Wheels have been decorated by such means as weaving paper between the spokes, placing tubular members around the spokes, and fastening buttons onto the spokes. These decorations were primarily for the eye appeal with little thought that a wheel properly decorated may also perform a safety function for the cyclist.

In 1976, the Consumer Product Safety Commission established requirements for bicycles to either contain retroreflective tire sidewalls or, alternatively, reflectors on the spokes of each wheel. Although reflectors placed on spoked bicycle wheels do reflect light, they do not provide visible assistance to bicycles during the dawn and dusk hours when many motorists drive without illuminated head lamps.

The object of the present invention is to provide a dynamically designed, highly visible bicycle wheel disk, that not only offers eye appeal, but also provides safety to the cyclist.

Another object of this invention is to provide an annular disk which is quickly and easily installed within the rim of a bicycle wheel.

It is a further object of this invention to provide a colorful disk which is retained between the spokes and rim of a bicycle wheel, thereby protecting the disk and offering further safety to the cyclist.

It is yet another object of this invention to provide an annular disk on which dynamic fluorescent designs may be displayed.

It is yet a further object of this invention to provide an annular disk which in part reflects illumination from motor vehicle headlamps.

Other objects and advantages of the present invention will be apparent to those skilled in the art by reference to the detailed description and drawings.

SUMMARY OF THE INVENTION

A decorative annular disk provided with a radial slit enabling the disk to be inserted between the spokes of a bicycle wheel. After the disk has been inserted and is contained between the spokes and the wheel rim, a twist tie is inserted through two holes, one on each side of the slit, and a spoke, thereby retaining the disk within the wheel rim. The disk contains a design which provides dynamic action when the wheel is rotated. Fluorescent and/or reflective materials can be printed or placed on the surface of the disk by adhesive to further attract motorists to the presence of the bicycle.

DESCRIPTION OF THE DRAWINGS

FIG. 1 is a plan view of an annular disk of the present invention.

FIG. 2 is a view of the present invention located in a spoked bicycle wheel.

FIG. 3 is a sectional view taken along Line 3—3 of FIG. 2.

DESCRIPTION OF THE PREFERRED EMBODIMENT

The annular disk is made of plastic such as polystyrene, or of fiberboard such as postboard. If postboard is used, it is desirable to laminate it with a plastic film to protect the surface from the weather. The disk can be relatively thin, ranging from 0.010 to 0.020 inches in thickness for example, depending on the material used, since it is fully retained between the spokes and the rim when installed in the wheel.

The annular disk outside diameter is preferably slightly smaller than the inside diameter of the bicycle wheel rim for ease of installation. The disk's inside diameter can be any size larger than the hub of the wheel. It has been found that an annular disk inside diameter to the outside diameter ratio of 0.4 to 0.9 provides sufficient space for a pleasing, highly visible, dynamic design when the wheel is rotated.

The annular disk contains a design of a bright color such as red, green, or blue. It is prefereable that the design, when rotated, provides a vision of action so as to attract attention to the bicycle, and thereby give further notice to the cyclist. A spiral or a star design are two patterns which provide this desired visual effect.

The design can be either silk screen or offset printed onto the disk. If the disk is made of plastic, the background may remain clear, but it is preferred that the design be printed on a white surface so that it stands out and attracts the attention of motorists. Since it is most difficult to see bicycles at dusk and dawn, a fluorescent design printed on the disk provides an additional safety feature to the cyclist during these hours of the day. A reflective design or background may be printed on the disk to provide reflection from illuminated motor vehicle headlamps. As an alternative, pieces of reflective sheet may be bonded at various locations on the disk to provide the desired attention from motor vehicle headlamps.

Referring now to the drawings and, in particular, FIG. 1, there is shown an annular disk of the present invention. The disk 4 contains a printed dynamic design 5. The disk contains a slit 6 between the inside and outside diameters of the disk 4. On each side of the slit 6, are holes 7a and 7b though which a tie 9 is placed for retaining the disk 4 to the wheel.

A reflective surface may be either printed onto the disk or reflective sheet material 8, preferably containing an adhesive backing, may be placed at various locations on the surface of the disk.

Refering now to FIGS. 2 and 3, there is shown disk 4 mounted in a bicycle wheel 10. To install the disk, the leading edge of the slit 6 is inserted between the spokes 11, of the wheel rim 12. The disk 4 is fed around the rim of the wheel, always keeping the leading edge of the slit between the spokes 11a and 11b which extend from the center of the rim 12 to each side of the hub 13. After the complete disk is contained within the rim and all the spokes, the free ends of the annular disk are secured together by a fastening means. Numerous fastening means are suitable for this purpose, one being a tie 9 inserted through the two holes 7a and 7b and secured around one spoke 11. Many suitable ties may be used. For example, the tie may be a string, a plastic and/or wire twist tie, or a wire clip or ring. Other examples of fastening means to secure the free ends of the annular disk may be a locking tongue in groove, adhesives, adhesive tape, fasteners marketed under the trademark Velcro, and independent clips that fit over both free ends of the disk.

Note that the disk is not woven around any spokes, but is contained completely between the spokes as shown in FIG. 3, thereby preventing the disk from coming into contact with any part of the bicycle frame when the wheel is rotated. This offers both safety to the cyclist and protection to the annular disk.

Although but one embodiment of the present invention had been illustrated and described, it is understood that changes and modifications may be made, such as making the annular disk from more than one section with each section being connected either to a spoke or an adjacent section.

This and other various changes and modifications may be made therein by those skilled in the art without departing from the spirit of the invention and having thus described my invention, what I claim is:

1. A bicycle wheel safety insert for introduction within the rim and between the spokes of a bicycle wheel, comprising:
   (a) an annular disk bearing a visual design, and having a slit extending the width thereof, said slit defining first and second free ends of said annular disk; and,
   b) fastening means for securing said first and second free ends of said annular disk.
2. The bicycle wheel safety insert according to claim 1, wherein said slit is radial.
3. The bicycle wheel safety insert according to claim 1, wherein said visual design indicates dynamic action when the wheel is rotated.
4. The bicycle wheel safety insert according to claim 1, wherein said visual design is of a fluorescent material.
5. The bicycle wheel safety insert according to claim 1, further comprising a reflective material.
6. The bicycle wheel safety insert according to claim 1, wherein said fastening means comprises:
   (a) first and second holes extending through said annular disk at said first and second free ends thereof; and,
   (b) tie means operative to extend through said first and second holes so as to enable securement of said first and second free ends adjacent one another.
7. The bicycle wheel safety insert according to claim 6, wherein said tie means is inserted through the holes for fastening to a bicycle spoke.
8. The bicycle wheel safety insert according to claim 1, wherein said tie means is a length of string.
9. The bicycle wheel safety insert according to claim 1, wherein said tie means is a twist tie.
10. The bicycle wheel safety insert according to claim 1, in which the annular disk diameter ratio is less than 0.9.

* * * * *